United States Patent
Liu et al.

(10) Patent No.: US 12,526,656 B2
(45) Date of Patent: Jan. 13, 2026

(54) PREDICTING 5G USER PLANE USING CONTROL PLANE FEATURES AND GRANGER CAUSALITY FOR FEATURE SELECTION

(71) Applicant: GM Global Technology Operations LLC, Detroit, MI (US)

(72) Inventors: Sheng Liu, Novi, MI (US); Fan Bai, Ann Arbor, MI (US); Chuan Li, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 300 days.

(21) Appl. No.: 18/494,189

(22) Filed: Oct. 25, 2023

(65) Prior Publication Data

US 2025/0142359 A1    May 1, 2025

(51) Int. Cl.
*H04W 24/02* (2009.01)
*G06N 3/088* (2023.01)
*G06N 5/022* (2023.01)
*H04W 4/40* (2018.01)

(52) U.S. Cl.
CPC ............ *H04W 24/02* (2013.01); *G06N 3/088* (2013.01); *G06N 5/022* (2013.01); *H04W 4/40* (2018.02)

(58) Field of Classification Search
None
See application file for complete search history.

(56) References Cited

U.S. PATENT DOCUMENTS

| 2019/0319868 A1 | 10/2019 | Svennebring et al. |
| 2023/0345317 A1* | 10/2023 | Sarkar ............... H04W 36/0069 |
| 2024/0298221 A1* | 9/2024 | Sarkar .................. H04W 36/30 |

FOREIGN PATENT DOCUMENTS

| DE | 102021214675 A1 | 6/2023 |
| WO | 2022144582 A1 | 7/2022 |

* cited by examiner

*Primary Examiner* — Adolf Dsouza
(74) *Attorney, Agent, or Firm* — Vivacqua Crane, PLLC

(57) ABSTRACT

A system for optimizing performance, managing network traffic, and enhancing user experience includes a host device a cloud computing server and controllers. The controllers execute control logic including a prediction application (PA) that obtains sensor data from the sensors, sends control and user plane data to infrastructure, and to the cloud computing servers, and accesses prior knowledge data stored within memory of the cloud computing servers. Additional control logic performs a Granger causality test on the user and control plane data, and utilizes a prediction model to generate a prediction from fused user and control plane data. A prediction verifier is applied to the prediction from the prediction model, and the PA enables the host device to adapt to dynamic wireless communications network conditions.

20 Claims, 8 Drawing Sheets

PREDICTING 5G USER PLANE USING CONTROL PLANE FEATURES AND GRANGER CAUSALITY FOR FEATURE SELECTION

INTRODUCTION

The present disclosure relates to cellular communications systems, and more particularly to short-term changes in cellular network connection quality.

Cellular networks are increasingly being used by a variety of different devices, including vehicles. Vehicles often utilize cellular networks to communicate with other vehicles, infrastructure, and the like. In order to optimize performance, manage network traffic, and enhance user experiences, machine learning techniques are often utilized for feature selection. However, traditional machine learning techniques often do not capture relationships between control plane information and user plane metrics in dynamic environments.

Accordingly, while current systems and methods for optimizing performance, managing network traffic, and enhancing user experience through user plane metric predictions achieve their intended purpose, there is a need for new and improved systems and methods for predicting user plane metrics using control plane features that are highly adaptable, function well in dynamic environments, improve cellular communication reliability and user experience, and which can be easily applied to new and existing platforms without increasing system complexity.

SUMMARY

In several aspects of the present disclosure a system for predicting a user plane using control plane features and Granger causality includes a host device having one or more sensors. The one or more sensors detect telematics information, telecommunications information, host device telemetry information, and host device position information. The system further includes one or more cloud computing servers and one or more controllers. Each of the one or more controllers has a processor, a memory, and one or more input/output (I/O) ports. The I/O ports are in communication with the one or more sensors and the one or more cloud computing servers. The memory stores programmatic control logic. The processor executes the programmatic control logic. The programmatic control logic includes a prediction application (PA). The PA includes at least first, second, third, fourth, fifth, and sixth control logic portions. The first control logic obtains sensor data from the one or more sensors. The second control logic sends control plane data and user plane data to infrastructure, and to the cloud computing servers via the I/O ports. The third control logic accesses prior knowledge data stored within memory of the cloud computing servers. The fourth control logic performs a Granger causality test on the user plane data and the control plane data. The fifth control logic utilizes a prediction model to generate a prediction from fused user plane data and control plane data. The sixth control logic applies a prediction verifier to the prediction from the prediction model. The PA enables the host device to make reliable predictions that allow the host device to adapt to dynamic wireless communications network conditions even when a best possible model is not fully trained.

In another aspect of the present disclosure the host device further defines a vehicle communicating with the cloud computing servers via a wireless communications network.

The first control logic further includes obtaining telematics information, telecommunications information, vehicle telemetry information, and vehicle position information from the one or more sensors.

In yet another aspect of the present disclosure the second control logic further includes control logic for sending control plane data radio resource control (RRC) messages to infrastructure including one or more cellular towers and to one or more cloud computing server. The second control logic also receives control plane data RRC messages from the one or more cellular towers and from the one or more cloud computing servers and sends user plane data to the one or more cellular towers and to the one or more cloud computing servers. The second control logic further receives user plane data from the one or more cellular towers and from the one or more cloud computing servers.

In still another aspect of the present disclosure the third control logic further includes control logic for accessing prior knowledge data including: data obtained from sensors of the host device and from additional devices, data obtained from global positioning system (GPS) satellites, data obtained from infrastructure including one or more cellular towers. The third control logic further compares data control plane data RRC messages from the host device to the prior knowledge data to generate a partial input to the prediction verifier.

In yet another aspect of the present disclosure the fourth control logic further includes control logic for applying a Granger causality test to the control plane data RRC messages and to the user plane data. The Granger causality test outputs a P-value that predicts when a change in control plane data RRC messages has caused a change in the user plane data. The Granger causality test is applied via at least three distinct selections based on the P-value, including: a threshold P-value selection, a fixed number P-value selection, and a conditional selection. In the threshold P-value selection, all control plane data RRC features having a P-value less than a predetermined threshold value are used. In the fixed number P-value selection, control plane data RRC features are ranked from smallest to largest, and a predetermined quantity of features having smallest P-values are selected. In the conditional selection, control plane data RRC features from the threshold P-value selection and from the fixed number P-value selection are compared. When it is determined that the fixed number P-value selection has generated a P-value less than the P-value associated with the threshold P-value selection, the fixed number P-value selection indicates Granger causation between the control plane data RRC features and the user plane data. When it is determined that the threshold P-value selection has generated a P-value less than the P-value associated with the fixed number P-value selection, the threshold P-value selection indicates Granger causation between the control plane data RRC features and the user plane data. When it is determined that the threshold P-value selection and the fixed number P-value selection values are equal to one another, then the threshold and fixed number P-value selections are equally indicative of Granger causation between the control plane data RRC features and the user plane data.

In still another aspect of the present disclosure the fifth control logic further includes control logic for utilizing output of the Granger causality test to reduce a quantity of data fed into the prediction model from a first quantity of data to a second quantity of data smaller than the first and preventing overfeeding of the prediction model. The fifth control logic also utilizes one or more of a long short-term memory (LSTM) model, a recurrent neural network (RNN), or an autoregressive integrated moving average model (ARIMA) to generate a multivariant prediction from user plane data and control plane data output from the Granger causality test.

In yet another aspect of the present disclosure, the fifth control logic further includes control logic for online training the PA by: initializing the PA as a zero feature model as a baseline, sending control plane messages with Granger causality test result information and a prediction root-mean-square error (RMSE) of current on-board zero-feature model to the cloud computing server, evaluating on-board zero-feature model prediction RMSE training speed and predictions, and selectively deploying a new model to the host device.

In still another aspect of the present disclosure the sixth control logic further includes control logic for receiving data indicating a trigger event has occurred and for initializing the prediction verifier with prior knowledge and with a user plane time series u(n) and a control plane time series C(n) as inputs. The sixth control logic further generates a weighted fused statistical prediction according to: $p_f = w1 \cdot p_s + w2 \cdot p_l$, where w1 is a first weight applied to a statistical prediction $p_s$ generated by a statistical prediction model as applied to the prior knowledge and user plane time series, w2 is a second weight, different from the first weight, applied to an LSTM prediction $p_l$, and $p_f$ is a fused prediction applied to the fused user plane and control plane data.

In yet another aspect of the present disclosure the control logic of the PA further includes: control logic that applies non-uniform upsampling in data collection and time series formulation for both user plane and control plane data.

In still another aspect of the present disclosure the non-uniform upsampling further includes control logic that reduces bandwidth consumption and processing complexity from a first level to a second level lower than the first level by obtaining user plane and control plane data only upon the occurrence of a trigger event and at one or more additional points in time after a predefined time δt after the trigger event. When a value of the control plane time series at time δt after the trigger event is greater than or equal to a value of the control plane time series at a subsequent trigger event, the non-uniform upsampling causes the PA to increment the control plane time series to collect data upon the occurrence of a subsequent trigger event, and when a value of the control plane time series at time δt after the trigger event is less than the value of the control plane time series at the subsequent trigger event, causing the PA to upsample the control plane time series.

In yet another aspect of the present disclosure a method for predicting a user plane using control plane features and Granger causality includes: detecting telematics information, telecommunications information, host device telemetry information, and host device position information with one or more sensors mounted to a host device, utilizing one or more cloud computing servers, and utilizing one or more controllers. Each of the one or more controllers has a processor, a memory, and one or more input/output (I/O) ports. The I/O ports are in communication with the one or more sensors and the one or more cloud computing servers. The memory stores programmatic control logic. The processor executes the programmatic control logic. The programmatic control logic including a prediction application (PA) having control logic that: obtains sensor data from the one or more sensors and sends control plane data and user plane data to infrastructure, and to the cloud computing servers via the I/O ports. The PA control logic further accesses prior knowledge data stored within memory of the cloud computing servers, performs a Granger causality test on the user plane data and the control plane data, and utilizes a prediction model to generate a prediction from fused user plane data and control plane data. The control logic of the PA also applies a prediction verifier to the prediction from the prediction model and enables, via the PA, the host device to make reliable predictions that allow the host device to adapt to dynamic wireless communications network conditions even when a best possible model is not fully trained.

In still another aspect of the present disclosure the host device further defines a vehicle communicating with the cloud computing servers via a wireless communications network, and the control logic of the PA further includes control logic for obtaining telematics information, telecommunications information, vehicle telemetry information, and vehicle position information from the one or more sensors.

In yet another aspect of the present disclosure the method further includes sending control plane data radio resource control (RRC) messages to infrastructure including one or more cellular towers and to one or more cloud computing servers, and receiving control plane data RRC messages from the one or more cellular towers and from the one or more cloud computing servers. The method further includes sending user plane data to the one or more cellular towers and to the one or more cloud computing servers, and receiving user plane data from the one or more cellular towers and from the one or more cloud computing servers.

In still another aspect of the present disclosure the method further includes accessing prior knowledge data including: data obtained from sensors of the host device and from additional devices, data obtained from global positioning system (GPS) satellites, data obtained from infrastructure including one or more cellular towers, and comparing data control plane data RRC messages from the host device to the prior knowledge data to generate a partial input to the prediction verifier.

In yet another aspect of the present disclosure the method further includes applying a Granger causality test to the control plane data RRC messages and to the user plane data. The Granger causality test outputs a P-value that predicts when a change in control plane data RRC messages has caused a change in the user plane data. The Granger causality test is applied via at least three distinct selections based on the P-value, including: a threshold P-value selection, a fixed number P-value selection, and a conditional selection. In the threshold P-value selection, all control plane data RRC features having a P-value less than a predetermined threshold value are used. In the fixed number P-value selection, control plane data RRC features are ranked from smallest to largest, and a predetermined quantity of features having smallest P-values are selected. In the conditional selection, control plane data RRC features from the threshold P-value selection and from the fixed number P-value selection are compared. When it is determined that the fixed number P-value selection has generated a P-value less than the P-value associated with the threshold P-value selection, the fixed number P-value selection indicates Granger causation between the control plane data RRC features and the user plane data. When it is determined that the threshold P-value selection has generated a P-value less than the P-value associated with the fixed number P-value selection, the threshold P-value selection indicates Granger causation between the control plane data RRC features and the user plane data. When it is determined that the threshold P-value selection and the fixed number P-value selection values are equal to one another, then the threshold and fixed number P-value selections are equally indicative of Granger causation between the control plane data RRC features and the user plane data.

In still another aspect of the present disclosure the method further includes utilizing output of the Granger causality test to reduce a quantity of data fed into the prediction model from a first quantity of data to a second quantity of data smaller than the first and preventing overfeeding of the prediction model and utilizing one or more of a long short-term memory (LSTM) model, a recurrent neural network (RNN), or an autoregressive integrated moving average model (ARIMA) to generate a multivariant prediction from user plane data and control plane data output from the Granger causality test.

In yet another aspect of the present disclosure the method further includes online training the PA by: initializing the PA as a zero feature model as a baseline, and sending control plane messages with Granger causality test result information and a prediction root-mean-square error (RMSE) of current on-board zero-feature model to the cloud computing server. Online training the PA further includes evaluating on-board zero-feature model prediction RMSE training speed and predictions, and selectively deploying a new model to the host device.

In still another aspect of the present disclosure the method further includes receiving data indicating a trigger event has occurred, initializing the prediction verifier with prior knowledge and with a user plane time series u(n) and a control plane time series C(n) as inputs, and generating a weighted fused statistical prediction according to: $p_f = w1 \cdot p_s + w2 \cdot p_l$, where w1 is a first weight applied to a statistical prediction $p_s$ generated by a statistical prediction model as applied to the prior knowledge and user plane time series, w2 is a second weight, different from the first weight, applied to an LSTM prediction $p_l$, and $p_f$ is a fused prediction applied to the fused user plane and control plane data.

In yet another aspect of the present disclosure the method further includes applying non-uniform upsampling in data collection and time series formulation for both user plane and control plane data and reducing bandwidth consumption and processing complexity from a first level to a second level lower than the first level by obtaining user plane and control plane data only upon the occurrence of a trigger event and at one or more additional points in time after a predefined time δt after the trigger event. When a value of the control plane time series at time δt after the trigger event is greater than or equal to a value of the control plane time series at a subsequent trigger event, the method causes the PA to increment the control plane time series to collect data upon the occurrence of a subsequent trigger event, and when a value of the control plane time series at time δt after the trigger event is less than the value of the control plane time series at the subsequent trigger event, the method causes the PA to upsample the control plane time series.

In still another aspect of the present disclosure a method for predicting a user plane using control plane features and Granger causality includes detecting telematics information, telecommunications information, host device telemetry information, and host device position information with one or more sensors mounted to a host vehicle communicating with one or more cloud computing servers via a wireless communications network. The method further includes utilizing one or more controllers, each of the one or more controllers having a processor, a memory, and one or more input/output (I/O) ports, the I/O ports in communication with the one or more sensors and the one or more cloud computing servers. The memory stores programmatic control logic. The processor executes the programmatic control logic. The programmatic control logic includes a prediction application (PA). The PA includes control logic for obtaining telematics information, telecommunications information, vehicle telemetry information, and vehicle position information from the one or more sensors. The PA further includes control logic for sending, via the I/O ports, control plane data radio resource control (RRC) messages to infrastructure including one or more cellular towers and to one or more cloud computing servers. The PA further includes control logic for receiving control plane data RRC messages from the one or more cellular towers and from the one or more cloud computing servers, and sending user plane data to the one or more cellular towers and to the one or more cloud computing servers. The PA further includes control logic for receiving user plane data from the one or more cellular towers and from the one or more cloud computing servers. The PA further includes control logic for accessing prior knowledge data stored within memory of the cloud computing servers, the prior knowledge data including: data obtained from sensors of the host device and from additional devices, data obtained from global positioning system (GPS) satellites, data obtained from infrastructure including one or more cellular towers. The PA further includes control logic for comparing data control plane data RRC messages from the host device to the prior knowledge data to generate a partial input to the prediction verifier. The PA further includes control logic for applying a Granger causality test to the control plane data RRC messages and to the user plane data. The Granger causality test outputs a P-value that predicts when a change in control plane data RRC messages has caused a change in the user plane data. The Granger causality test is applied via at least three distinct selections based on the P-value, including: a threshold P-value selection, a fixed number P-value selection, and a conditional selection. In the threshold P-value selection, all control plane data RRC features having a P-value less than a predetermined threshold value are used. In the fixed number P-value selection, control plane data RRC features are ranked from smallest to largest, and a predetermined quantity of features having smallest P-values are selected. In the conditional selection, control plane data RRC features from the threshold P-value selection and from the fixed number P-value selection are compared. When it is determined that the fixed number P-value selection has generated a P-value less than the P-value associated with the threshold P-value selection, the fixed number P-value selection indicates Granger causation between the control plane data RRC features and the user plane data. When it is determined that the threshold P-value selection has generated a P-value less than the P-value associated with the fixed number P-value selection, the threshold P-value selection indicates Granger causation between the control plane data RRC features and the user plane data. When it is determined that the threshold P-value selection and the fixed number P-value selection values are equal to one another, then the threshold and fixed number P-value selections are equally indicative of Granger causation between the control plane data RRC features and the user plane data. The PA further includes control logic for utilizing output of the Granger causality test to reduce a quantity of data fed into the prediction model from a first quantity of data to a second quantity of data smaller than the first and preventing overfeeding of the prediction model. The PA further includes control logic for utilizing one or more of a long short-term memory (LSTM) model, a recurrent neural network (RNN), or an autoregressive integrated moving average model (ARIMA) to generate a multivariant prediction from user plane data and control plane data output from the Granger causality test. The PA further includes control logic for utilizing a prediction model to generate a prediction from fused user plane data and control plane data, including: online training the PA by: initializing the PA as a zero feature model as a baseline, and sending control plane messages with Granger causality test result information and a prediction root-mean-square error (RMSE) of current on-board zero-feature model to the cloud computing server. The PA further includes control logic for evaluating on-board zero-feature model prediction RMSE training speed and predictions, and selectively deploying a new model to the host device. The PA further includes control logic for applying a prediction verifier to the prediction from the prediction model, including: receiving data indicating a trigger event has occurred, initializing the prediction verifier with prior knowledge and with a user plane time series u(n) and a control plane time series C(n) as inputs, and generating a weighted fused statistical prediction according to: $p_f=w1 \cdot p_s+w2 \cdot p_l$, where w1 is a first weight applied to a statistical prediction $p_s$ generated by a statistical prediction model as applied to the prior knowledge and user plane time series, w2 is a second weight, different from the first weight, applied to an LSTM prediction $p_l$, and $p_f$ is a fused prediction applied to the fused user plane and control plane data. The PA further includes control logic for applying non-uniform upsampling in data collection and time series formulation for both user plane and control plane data, and reducing bandwidth consumption and processing complexity from a first level to a second level lower than the first level by obtaining user plane and control plane data only upon the occurrence of a trigger event and at one or more additional points in time after a predefined time δt after the trigger event. When a value of the control plane time series at time δt after the trigger event is greater than or equal to a value of the control plane time series at a subsequent trigger event, the method causes the PA to increment the control plane time series to collect data upon the occurrence of a subsequent trigger event, and when a value of the control plane time series at time δt after the trigger event is less than the value of the control plane time series at the subsequent trigger event, the method causes the PA to upsample the control plane time series. The PA further includes control logic for enabling the host device to make reliable predictions that allow the host device to adapt to dynamic wireless communications network conditions even when a best possible model is not fully trained.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
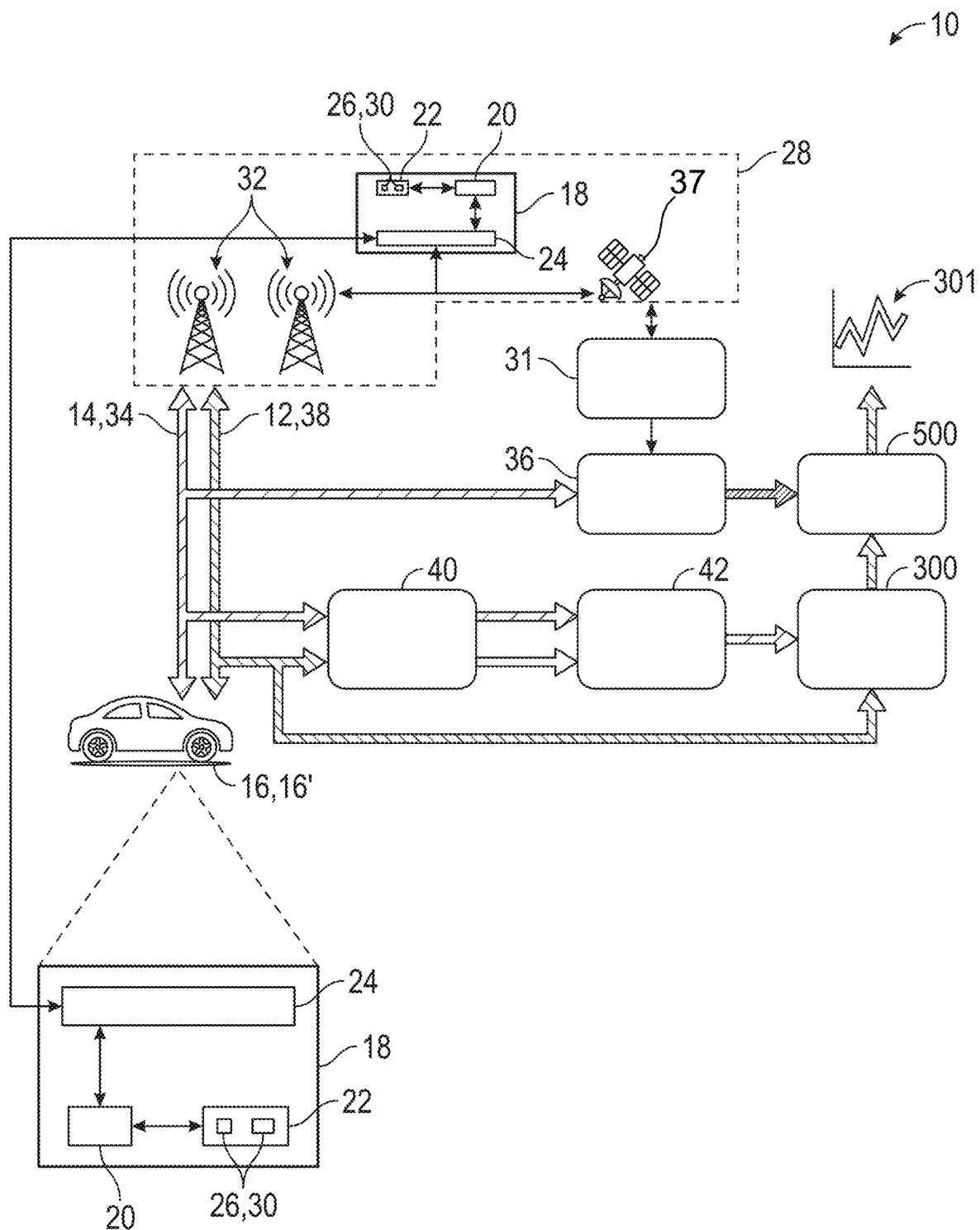
FIG. 1 is a schematic diagram of a system for predicting 5G user plane using control plane features and Granger causality for feature selection according to an aspect of the present disclosure.

Referring to FIG. 1, a system 10 for predicting a user plane 12 using control plane 14 features and Granger causality for feature selection is shown in schematic diagram form. The system 10 includes one or more devices, such as vehicles 16, each having one or more on-board controllers 18. It should be appreciated that the devices may include any of a wide variety of wirelessly-connected host devices, such as cellular phones, portable computers such as tablet computers, laptops, or the like without departing from the scope or intent of the present disclosure. However, for the sake of simplicity, clarity, and precision, the following description refers to non-limiting examples in which the devices or host devices are vehicles 16.

The on-board controllers 18 are non-generalized, electronic control devices having a preprogrammed digital computer or processor 20, non-transitory computer readable medium or memory 22 used to store data such as control logic, software applications, instructions, computer code, data, lookup tables, etc., and a transceiver or input/output (I/O) ports 24. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable memory 22 excludes wired, wireless, optical, or other communication links that transport transitory electrical or other signals. A non-transitory computer readable memory 22 includes media where data can be permanently stored and media where data can be stored and later overwritten, such as a rewritable optical disc or an erasable memory device. Computer code includes any type of program code, including source code, object code, and executable code. The processor 20 is configured to execute the code or instructions. In vehicles 12, the controller 18 may be a dedicated Wi-Fi controller or an engine control module, a transmission control module, a body control module, an infotainment control module, etc. The I/O ports 24 are configured to wirelessly communicate using Wi-Fi protocols under IEEE 802.11x, cellular protocols such as global system for mobile communications (GSM), code division multiple access (CDMA), wireless in local loop (WLL), general packet radio services (GPRS), 1G, 2G, 3G, 4G long term evolution (LTE), 5G, or the like.

The memory 22 may store one or more applications 26. An application 26 is a software program configured to perform a specific function or set of functions. The application 26 may include one or more computer programs, software components, sets of instructions, procedures, functions, objects, classes, instances, related data, or a portion thereof adapted for implementation in a suitable computer readable program code. The applications 26 may be stored within the memory 22 of the on-board controllers 18 in the vehicles 16, or in additional or separate memory, such as within a memory 22 of a cloud computing device such as a cloud computing server 28. Examples of the applications 26 include audio or video streaming services, games, browsers, social media, and an application for predicting 5G user plane 12 using control plane 14 features and Granger causality for feature selection, or the like. Hereinafter, for the sake of simplicity and to improve clarity, the application for predicting 5G user plane 12 using control plane 14 features and Granger causality for feature selection is referred to hereinafter as predication application (PA) 30.

In several aspects, the vehicles 16 generate, send, and receive data as they are operated. The data may include telematics information, telecommunications information, vehicle telemetry information, position information, data collected from onboard vehicle 16 sensors 31 or systems, or the like. The user plane 12 carries and communicates the data generated by the vehicles 16, such as data packets processed by protocols such as transmission control protocol (TCP), user diagram protocol (UDP), internet protocol (IP), and the like. By contrast, in the control plane 14, a carrier protocol such as a radio resource control (RRC) protocol handles signaling messages that are exchanged between one or more vehicles 16, or between end-user equipment such as the one or more vehicles 16 and a base station or infrastructure, such as cellular towers 32 and the like.

Wireless communications, especially those under GSM, CDMA, WLL, GPRS, 1G, 2G, 3G, 4G, and 5G are subject to a variety of signaling issues that can alter the quality and reliability of the data sent and received thereon. Accordingly, optimization of user plane 12 metrics such as bandwidth and throughput are important in managing communications network traffic, optimizing communications network performance, and enhancing user experience.

In several aspects, the vehicles 16 send control plane data in the form of RRC messages 34 to infrastructure such as the cellular towers 32 and/or cloud computing servers 28. Likewise, the vehicles 16 receive control plane data RRC messages 34 from cellular towers 32, cloud computing servers 28, and the like. Once control plane 14 RRC messages 34 are received by cloud computing servers 28, cellular towers 32, etc., the RRC messages are both added to a database of prior knowledge 36 and compared to the prior knowledge 36 stored in the memory 22 of the cloud computing servers 28 and/or cellular towers 32 and/or within the onboard memory 22 of the vehicle 16. In several aspects, the prior knowledge 36 is a compilation of data obtained from sensors 31 of a host device, such as a host vehicle 16, from sensors 31 aboard additional devices or vehicles 16', and from sensors 31 disposed on or acting as a part of infrastructure such as weather satellites, GPS satellites 37, or the like. However, it should be appreciated that the data from additional vehicles 16' within the prior knowledge 36 database is filtered or otherwise restricted in use based on predefined and/or variable metrics. Data from additional vehicles 16' may be obtained from those additional vehicles 16' at a variety of different locations, and over a variety of different time periods. It will be appreciated that in order for accurate and relevant predictions to be made, the system 10 is best served by utilizing only data from additional vehicles 16' that has been generated by such additional vehicles 16' that are close in physical proximity and/or temporally to the host vehicle 16. Similarly, data from GPS satellites, weather satellites, or the like, may be relevant to the host vehicle 16 for limited time periods, or for limited physical distances. Accordingly, the data from GPS and weather satellites is filtered similarly.

The precise definition of "close" may vary situationally, but should be understood to mean that the host vehicle 16 and additional vehicles 16' are within a predefined physical and/or temporal distance that allows data from the additional vehicles 16' to remain relevant to the host vehicle 16. For example, on a curve on a highway, while traveling at seventy miles-per-hour and in changeable weather conditions, data generated by additional vehicles 16' will have a half-life that is relatively short by comparison with data from additional vehicles 16' on a straight road and traveling at fifteen miles-per-hour in sunny, warm, dry weather.

Vehicles 16 also send user plane 12 data 38 to infrastructure such as the cellular towers 32 and/or cloud computing servers 28. Likewise, the vehicles 16 receive user plane data 38 messages from cellular towers 32, cloud computing servers 28, and the like. In several aspects, the user plane data 38 and the RRC messages 34 are subjected to a Granger causality test 40. The Granger causality test is utilized in assisting in feature selection 42 to generate user plane 12 predictions for 5G communications. The Granger causality test 40 functions as a predictor wherein if X "Granger-causes" Y, then past values of X are assumed to contain information that helps to predict the value of Y. The Granger causality test 40 outputs a p-value that has different size or value for different control plane 14 data. In several aspects, when the p-value 44 is less than a predefined significance level, it is inferred that X does have a predictive influence on Y, thereby indicating Granger causality. While the predefined significance level may vary from application to application, in some examples the significance level is less than 0.05.

Figure 2:
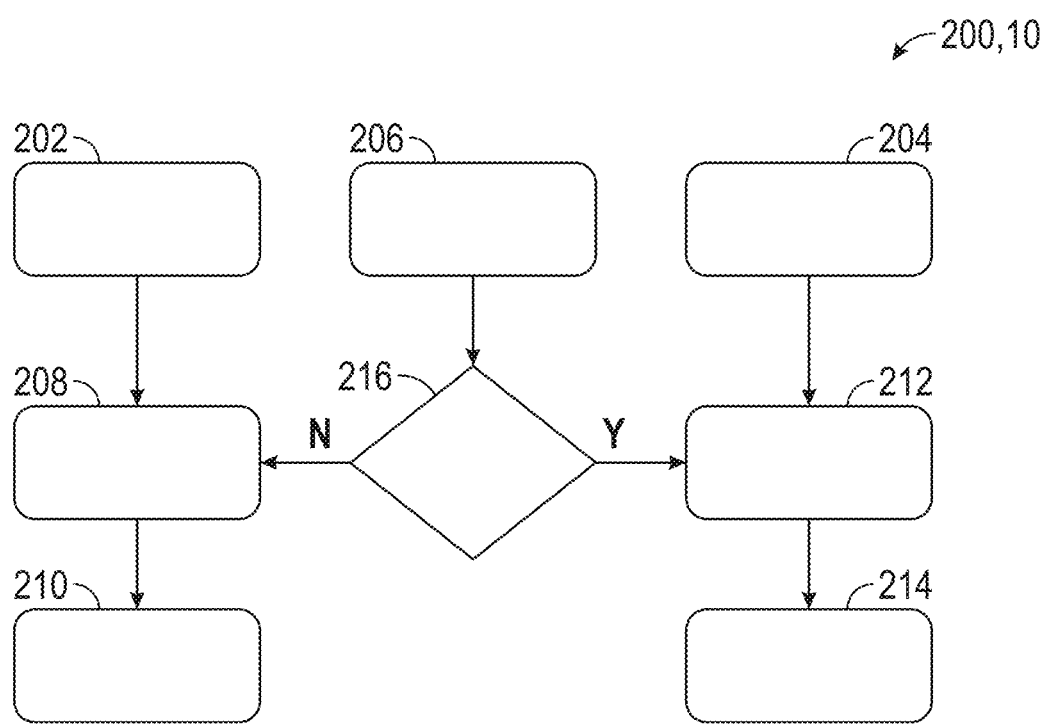
FIG. 2 is a flowchart depicting logical flow of a Granger causality test portion of the system for predicting 5G user plane using control plane features and Granger causality for feature selection of FIG. 1 according to an aspect of the present disclosure.
Figure 3A:
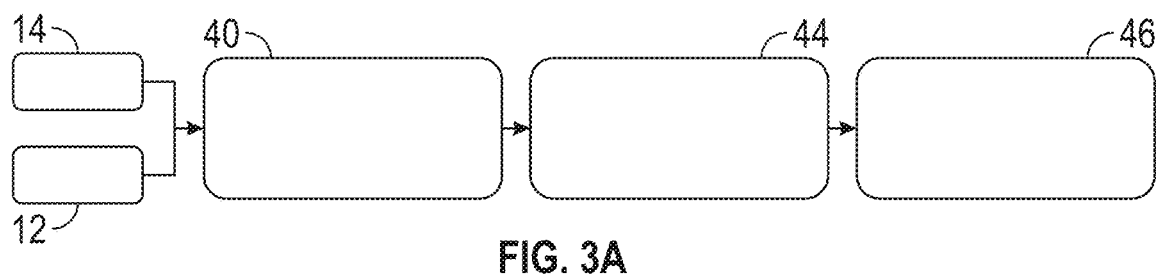
FIG. 3A is a flowchart depicting logical flow of a prediction model of the system for predicting 5G user plane using control plane features and Granger causality for feature selection of FIG. 1 according to an aspect of the present disclosure.
Figure 3B:
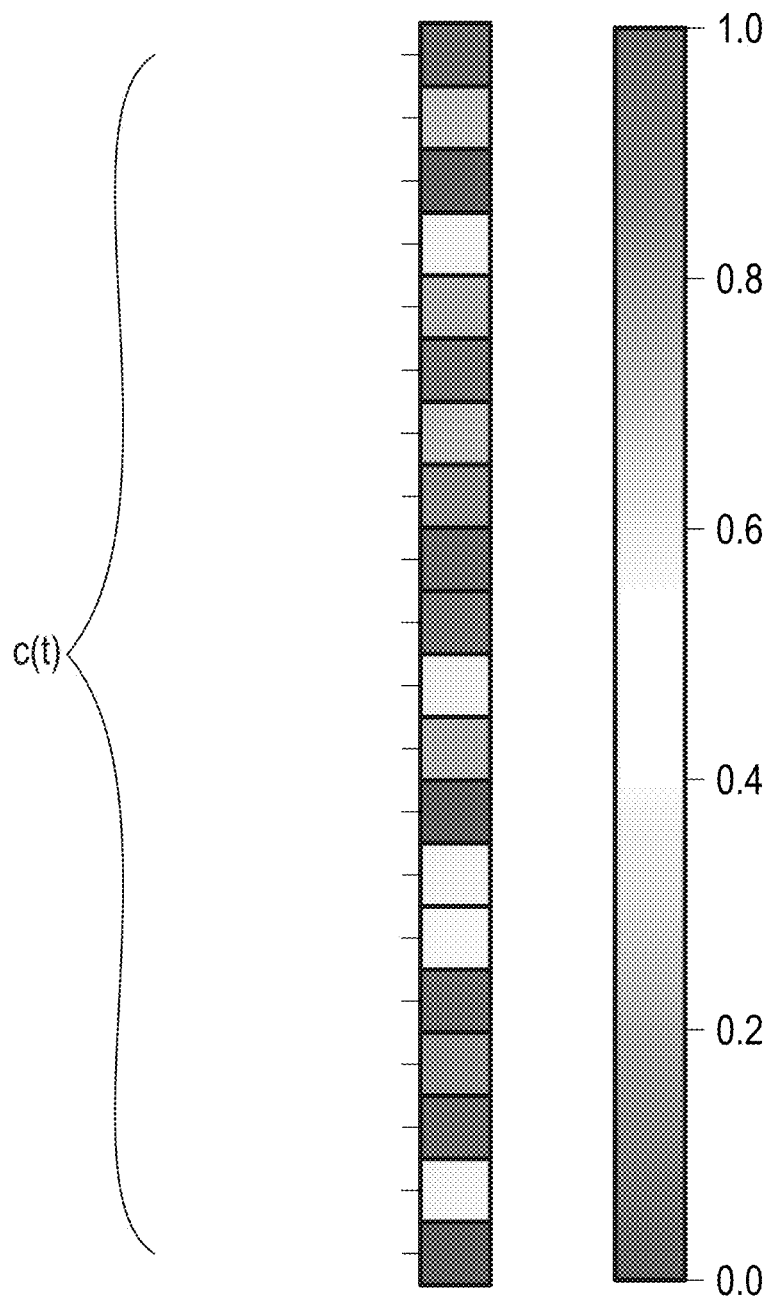
FIG. 3B is a chart depicting exemplary control plane time series data of the system for predicting 5G user plane using control plane features and Granger causality for feature selection of FIG. 1 according to an aspect of the present disclosure.

Turning now to FIGS. 2, 3A, and 3B, and with continued reference to FIG. 1, a method 200 of using the Granger causality test 40 to predict features is shown in flowchart form in further detail. In an example, the Granger causality test 40 is defined as:

1. $u(n) = a0 + a1u(n-1) + \ldots + amu(n-m) +$
$\qquad b1c(n-1) + \ldots + bmc(n-m) + e1(n);$
2. $u(n) = c0 + c1u(n-1) + \ldots + cmu(n-m) + e2(n);$ A feature test is then performed wherein the null hypothesis that b1=b2= . . . bm=0 is tested. When the null hypothesis is rejected, control plane features c(n) Granger-causes one or more user plane features u(n), where c(n)s are considered as the features that are used to enhance the prediction accuracy of u(n).

In several examples, at least three different feature selection methods based on the p-values of the Granger causality test 40 are utilized. Specifically, a threshold φ selection method 202, a fixed number selection method 204, and a conditional selection method 206 are used.

The threshold φ method 202 selects all c(n)s with a p-value 44 smaller than the threshold φ 208 according to:

3. $C\_1 = \{c(n):p(c(n)) < \phi\}, |C\_1| = N1$ where N1 is feature number 1 in block 210. It will be appreciated that the threshold φ is a predefined value that may vary from application to application and from situation to situation, but represents a value selected to ensure a predetermined level of accuracy and reliability that the c(n)s are accurate predictors based on their p-values.

By contrast, the fixed number method 204 calculates all p values from the control plane 14 data and ranks 212 the p-values from smallest to largest. The fixed number method 204 then selects a predetermined quantity of the features having the smallest p-values. In an example, the fixed number method 204 selects the three (3) features having the smallest p-values, however the precise quantity of features selected may vary without departing from the scope or intent of the present disclosure. The selection process may be represented as a selection of an N2 number of c(n)s with lowest p-values according to:

4. $C\_2 = \{c(n): \text{rank}\,(p(c(n))) <= N2\}, |C\_2| = N2$ where N2 is feature number 2 in block 214.

Finally, the conditional method 206 compares the values of N1 and N2 at block 216 to determine whether there is Granger causation. More accurately:

5. If $N2 < N1, C\_3 = C\_2$
6. If $N2 > N1, C\_3 = C\_1$

Accordingly, C_3 is theoretically a Granger cause of u(n) under the limits of the feature numbers available. That is, when N1<N2, then the fixed number method 204 has provided the most accurate result, while when N2<N1, then the threshold φ method 202 has provided the most accurate result. Likewise, when N2=N1, both the threshold φ selection method 202, and the fixed number selection method 204 are equally likely to produce accurate results.

Referring now more particularly to FIGS. 3A and 3B and with continuing reference to FIGS. 1 and 2, twenty (20) different control plane 14 time series data points are collected and depicted as the function c (t). Granger causality tests are 40 determine the probabilities of the c(n)s that are Granger-caused in a user plane time series u(n). As previously indicated, the lower a p-value 44 is, the higher the probability of c(n) in Granger causing u(n). The Granger causation may therefore be depicted as the function P (GC|p)∝f(p) in block 46 where f is a decreasing function.

Figure 4:
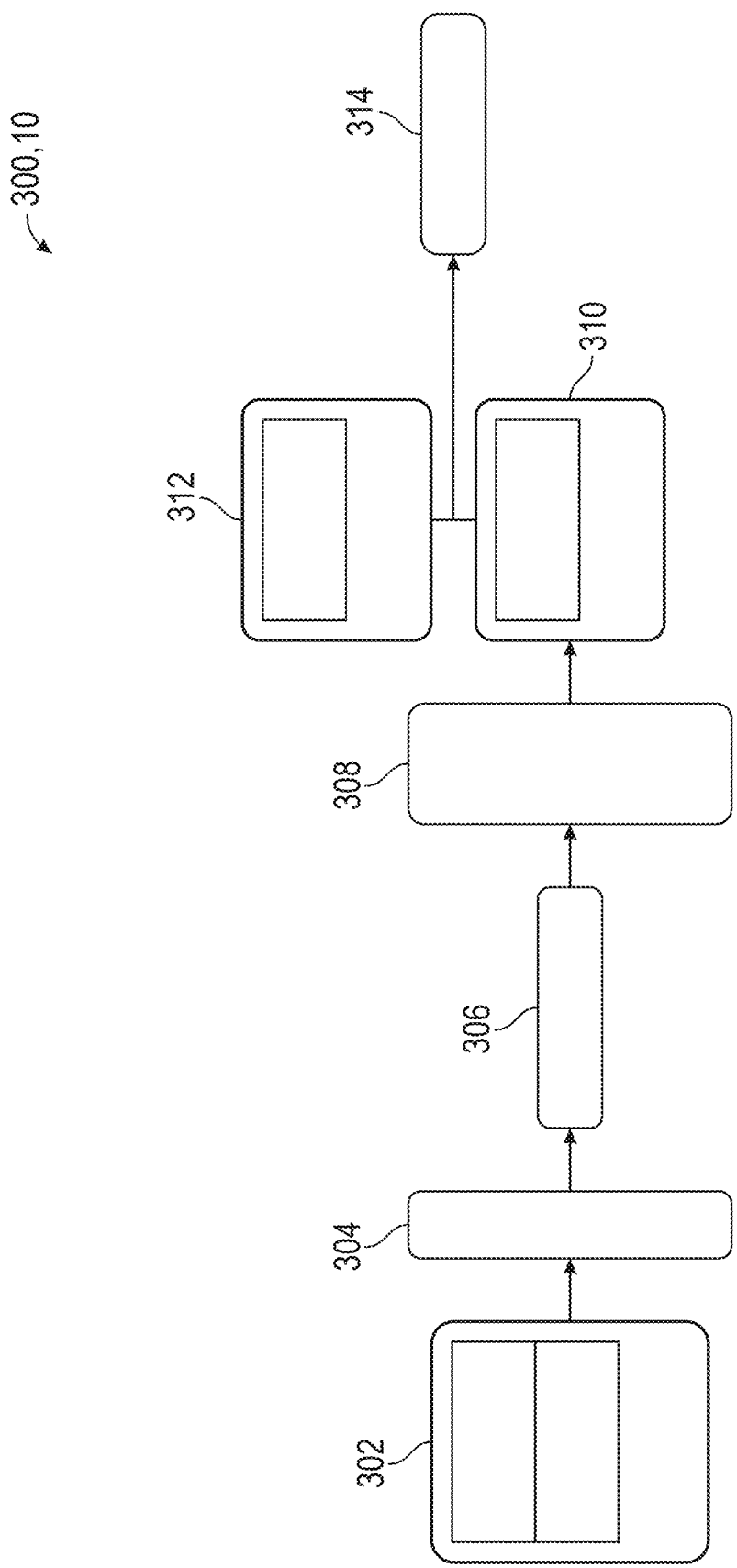
FIG. 4 is a flowchart depicting logical flow of a prediction model portion of the system for predicting 5G user plane using control plane features and Granger causality for feature selection of FIG. 1 according to an aspect of the present disclosure.

Turning now to FIG. 4 and with continuing reference to FIGS. 1-3, The system 10 utilizes a prediction model 300 to forecast short-term data rates 301. The prediction model 300 starts at block 302 where user plane 12 data [depicted as u(i:i+10)] and control plane 14 data [depicted as C(i:i+10)] are used as inputs. In several aspects, the Granger causality test 40 is used to verify the input data before use in the prediction model 300 in order to reduce the potential for overfeeding the prediction model 300. Overfeeding the prediction model 300 may cause the prediction model 300 to generate an output that is effectively meaningless because the prediction model 300 itself does not determine what input data is actually valuable to vehicle 16 or wireless communications network functionality. That is, the Granger causality test 40 reduces a quantity of data fed into the prediction model 300 from a first quantity of data to a second quantity of data smaller than the first quantity of data to avoid overfeeding the prediction model 300. In addition to preventing overfeeding—a factor which may degrade predictive performance of the system 10—the Granger causality test 40 offers capacity to select "relevant" input variables, thereby enhancing the model's predictive accuracy as compared to models without such inputs.

The user and control plane 12,14 data is normalized 304 and processed through a prediction algorithm 306. The prediction algorithm 306 shown is a long short-term memory (LSTM), however, the LSTM may be replaced by other feature-based time series prediction models such as a recurrent neural network (RNN), autoregressive integrated moving average (ARIMA), or the like without departing from the scope or intent of the present disclosure. The prediction model 300 then performs an inverse normalization 308 and generates a user plane 14 output 310 [depicted as u'(i+11)] which is then compared to a user plane 14 target output 312 [depicted as u(i+11)] to generate a root-mean-square error (RMSE) 314. In several aspects, the RMSE 314 defines a metric used to measure prediction error between the user plane 14 prediction output 310 and the target output 312, which is the ground truth.

Figure 5:
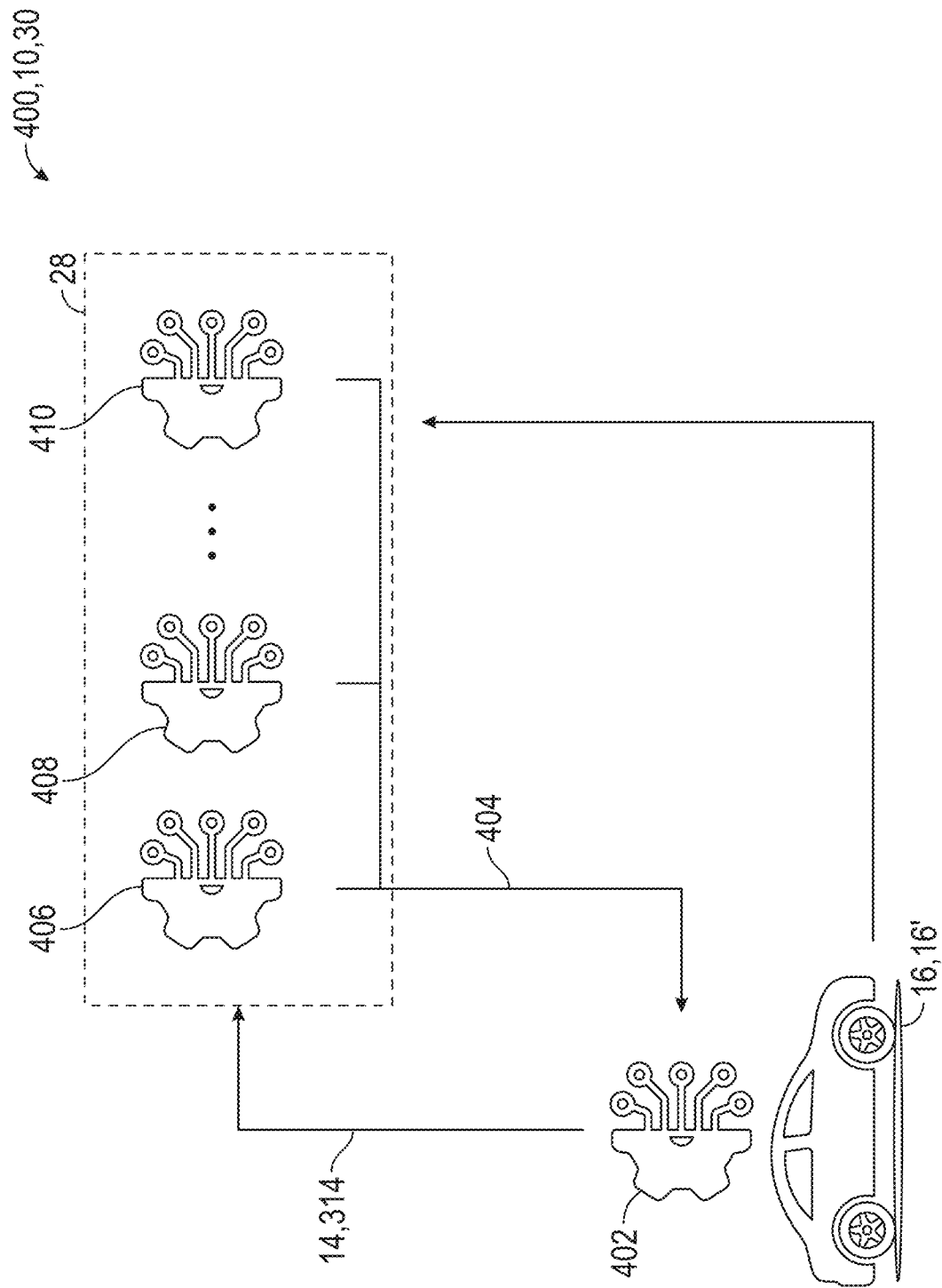
FIG. 5 is schematic diagram depicting an online training structure of the system for predicting 5G user plane using control plane features and Granger causality for feature selection of FIG. 1 according to an aspect of the present disclosure.

Turning now to FIG. 5 and with continuing reference to FIGS. 1-4, an online training structure 400 for the PA 30 is shown schematically. The PA 30 is initialized as a zero (0) feature model 402 operating on the host vehicle 16 controller 18. The zero feature model 402 serves as a baseline against which other features are subsequently compared. The host vehicle 16 sends current control plane 14 messages with Granger causality test 40 result information and the prediction RMSE 314 of the current on-board zero feature model 402 to the cloud computing server 28. Within the cloud computing server 28 multiple models are trained in parallel. Depending on comparisons of the prediction RMSE 314 and evaluations of the speed of training, the cloud computing server 28 decides whether and when to deploy a new model to the vehicle 16, and to thereby replace 404 the current model with a new model. Cloud computing server 28-based training enables the host vehicle 16 to make reliable predictions, even when the best possible model is not fully trained. It will be appreciated that the quantity of features in a given model is correlated with relative speeds of training and deployment processes. That is, a single feature model 406 model may be trained with greater speed than a two (2) feature model 408, and so forth. In further exemplary applications of the online training structure 400, results of the single feature model 406 are compared with the two-feature model 408 up to an N feature model 410. When the two-feature model 408 achieves an empirically better result than the single-feature model 406, then the two-feature model 408 is deployed to the host vehicle 16. Likewise, when the N-feature model 410 achieves a better result than an N−1 feature model (not specifically shown), then the N-feature model 410 is deployed to the host vehicle 16. It will be appreciated that the training of an N-feature model 410 is more computationally complex and therefore, slower, than the single feature model 406, the two-feature model 408, and so forth. However, the N-feature model 410 is more accurate and reliable than the N−1 feature model because the N-feature model 410 is optimized from Granger causality tests 40 of each of the sub-N-feature models 410. Accordingly, the N-feature model 410 is effectively an optimized, fine-tuned feature model for the host vehicle 16.

Figure 6:
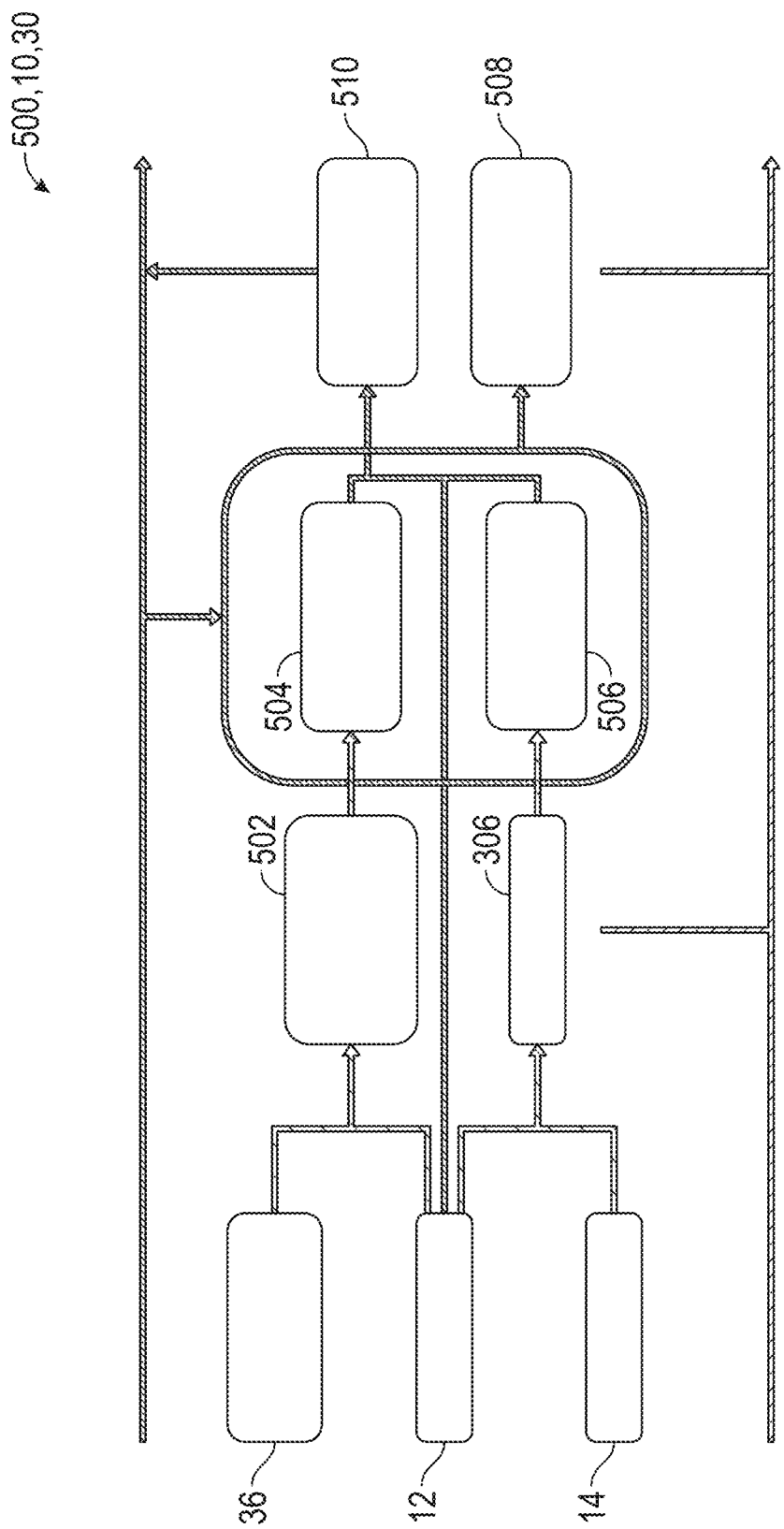
FIG. 6 is a flowchart depicting logical flow of a prediction verifier of the system for predicting 5G user plane using control plane features and Granger causality for feature selection of FIG. 1 according to an aspect of the present disclosure.

Turning now to FIG. 6 and with continuing reference to FIGS. 1-5, a prediction verifier 500 is shown in flowchart form. The prediction verifier 500 leverages insights obtained from in-field experimentation to detect and mitigate the impact of prediction outliers on the predictions of the PA 30 as time progresses. In several aspects, the prediction verifier 500 is initialized upon receiving data that indicates the occurrence of a trigger event (n) and generates a prediction (m). Trigger events (n) may be any of a variety of different types of changes in user and/or control plane 12, 14 situations. In a non-limiting example, a changes in control plane 14 may directly alter or impact the state of the user plane 12 when a handover event between multiple cellular towers 32 occurs. That is, during a handover between cellular towers 32, a bandwidth of communications between the host vehicle 16 and the cellular towers 32 may decrease from a first level to a second level lower than the first. Similarly, when line-of-sight communications between the host vehicle 16 and cellular towers 32, or the like may be impeded by the presence of tall buildings, tunnels, mountains, and so forth, thereby causing a change in control plane 14 activity. That is, an RSRP (reference signal received power), RSRQ (reference signal received quality), and/or RSSI (received signal strength indicator) may be negatively impacted by blocked line-of-sight, by cellular tower 32 handoff, and the like. In another example, when a speed of the host vehicle 16 is low, multiple or frequent handovers between cellular towers 32 may occur within a small physical distance, thereby causing bandwidth drop-off, and changes in user-plane 12 experience. In yet another example, when a high-bandwidth-demand application, for example, a video streaming service application, accessed through a host vehicle 16 human-machine interface (HMI) or via user devices in electronic communication with the controller 18, is terminated, a quantity of bandwidth released for use by other systems may dramatically changes in the control plane 14, resulting in user plane 12 functionality changes. Accordingly, the prediction verifier 500 verifies and adjusts the prediction results of the LSTM prediction algorithm 306.

Accordingly, the prediction verifier 500 utilizes prior knowledge 36, as well as the user plane time series u(n) and control plane time series C(n) as inputs. More specifically, the user plane time series u(n) and prior knowledge 36 are used as inputs to a statistical prediction model 502. The statistical prediction model 502 may be any of a variety of different statistical prediction model types including but not limited to: Null Hypothesis Statistical Testing (NHST) models, Multivariate Kalman Filters, Multivariate Bayesian Analyses, or the like. The statistical prediction model 502 generates a statistical prediction 504 or statistical prediction result $p_s$. Similarly, the control plane time series C(n) and user plane time series u(n) data are used as inputs to the LSTM prediction algorithm 306. The LSTM prediction algorithm 306 generates an LSTM statistical prediction 506 or LSTM prediction result $p_l$. The statistical prediction results $p_s$ are used to further reduce errors in the LSTM prediction results $p_l$ and to generate a final prediction $p_f$ 508 that is defined by:

7. $p_f = w1 \cdot p_s + w2 \cdot p_l$ after which, prediction weights (w1 and w2) 510 are adjusted to minimize the mean-square error (MSE) loss function:

8. $L(w1, w2) = E(T - (w1 \cdot p_s + w2 \cdot p_l))^2.$

The weights w1 and w2 are then updated using a gradient descent algorithm according to:

9. $w1 = w1 - a \cdot \dfrac{dL}{dw1}, w2 = w2 - a \cdot \dfrac{dL}{dw2}.$

Then, the gradients themselves are computed according to:

10. $\dfrac{dL}{dw1} = -2E(T - (w1 \cdot p_s + w2 \cdot p_l) \cdot p_s)$

11. $\dfrac{dL}{dw2} = -2E(T - (w1 \cdot p_s + w2 \cdot p_l) \cdot p_l),$ where T is the ground truth, and a is a learning rate. The verification process is conducted at certain trigger events (n) where prior knowledge 36 has significant impact on the change of the data rate. It will be appreciated that the weights w1, w2, w(j−1), w(j) may vary from application to application, and from model to model, but should be understood to assist the prediction verifier 500 and PA 30 by choosing which of the single feature, two feature, or up to N-feature models 406, 408, 410 is the appropriate model to address a given trigger event (n).

Figure 7A:
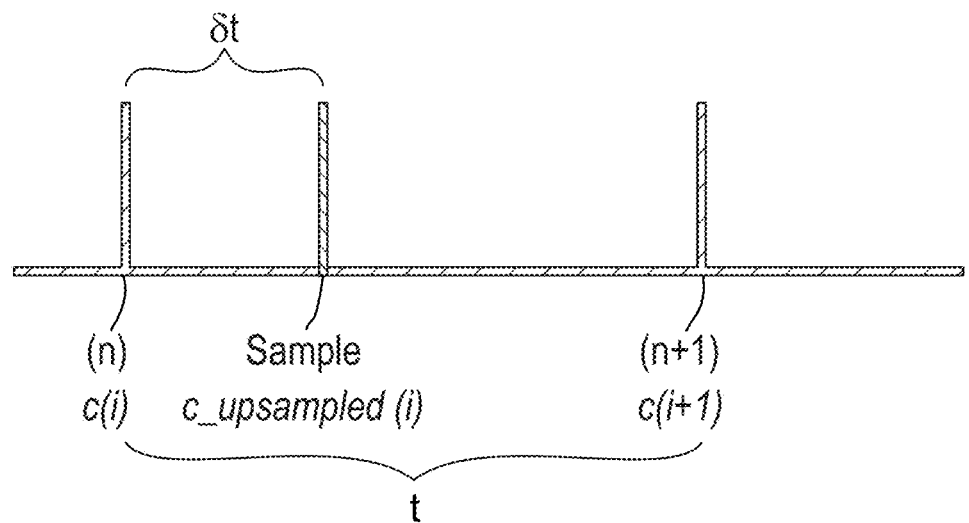
FIG. 7A is a depiction of a timeline for data collection and time series formulation in the system for predicting 5G user plane using control plane features and Granger causality for feature selection of FIG. 1 according to an aspect of the present disclosure.
Figure 7B:
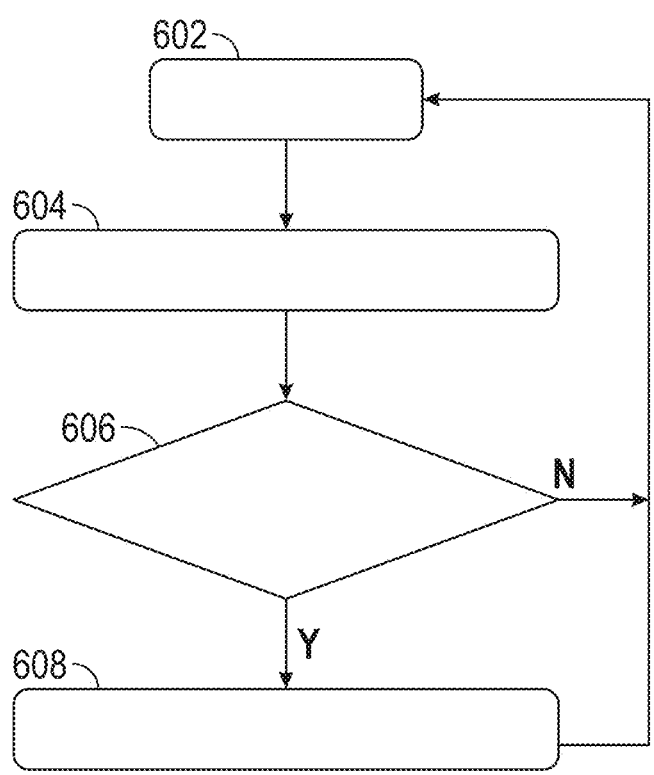
FIG. 7B is a flowchart depicting logical flow of an upsampling process of the system for predicting 5G user plane using control plane features and Granger causality for feature selection of FIG. 1 according to an aspect of the present disclosure.

Turning now to FIGS. 7A and 7B in order to further enhance the accuracy of predictions, the PA 30 utilizes non-uniform or ununiform upsampling in data collection and time series formulation. More specifically, the control plane 14 data is collected from RRC messages at the client or host vehicle 16. Key control plane 14 information (C) is extracted from the RRC messages and monitored according to:

12. $c(n) = \begin{cases} 1, & C \text{ detected} \\ 0, & C \text{ not detected} \end{cases}$ while the user plane time series may be depicted as:

13. $u(n) = \dfrac{Thput(\overline{n}:n)}{n - \overline{n}}$ where Thput($\overline{n}$:n) is the data throughput or bandwidth of the system. In several aspects, when c(n)=1, C detected, the C that has been detect may be a handover between cellular towers 32, or similar. While uniform sampling may be used to some extent, it has several disadvantages in the present context. Specifically, in uniform sampling, it is difficult to align sampling points with precise control plane 14 event occurrences, thus introducing additional measurement uncertainty and increasing the potential for error. Likewise, high-sampling frequency in uniform sampling leads to a large volume of data, high bandwidth consumption, and elevated computational complexity in the prediction model. Non-uniform or ununiform sampling offers certain advantages, namely, the ability to sample based on control plane 14 event occurrence. However, because non-uniform or ununiform sampling only triggers upon the occurrence of specific control plane 14 events, user plane 12 changes may be lost between the occurrences of multiple triggering control plane 14 events. That is, U (n) represents an average data rate between two consecutive control plane 14 events, but fails to capture changes occurring therebetween. Accordingly, the PA 30 applies upsampling at locations of significant change in the user plane 12.

In data collection and time series formulation, the PA 30 double-samples the user plane time series u(n) by taking an extra sampling point at a time δt after each of the control plane 14 events. δt is obtained by estimating the time at which the most significant fluctuation in throughput occurs following a specific control plane 14 event. Inserting the δt-based sampling data into the sampling procedure improves the prediction accuracy. Turning now more specifically to FIG. 7B an upsampling method 600 is shown in further detail. At block 602 the PA 30 obtains control plane time series c(n) data. At block 604 the PA 30 appends the upsampled control plane time series c_upsampled to the control plane time series c(n). At block 606, the PA 30 compares the value of the control plane time series c(n) at time δt after a trigger event (n) to the value of the control plane time series c(n) at a subsequent trigger event (n+1). When the value of the control plane time series c(n) at time δt after the trigger event (n) is greater than or equal to the value of the control plane time series c(n) at the subsequent trigger event (n+1), the control plane time series c(n) is incremented to the collect data upon the occurrence of a subsequent triggering event n++. However, when the value of the control plane time series c(n) at time δt after the trigger event (n) is less than the value of the control plane time series c(n) at the subsequent trigger event (n+1), at block 608, an upsampled control plane time series c_upsampled is obtained and then applied to the control plane time series c(n).

Figure 8:
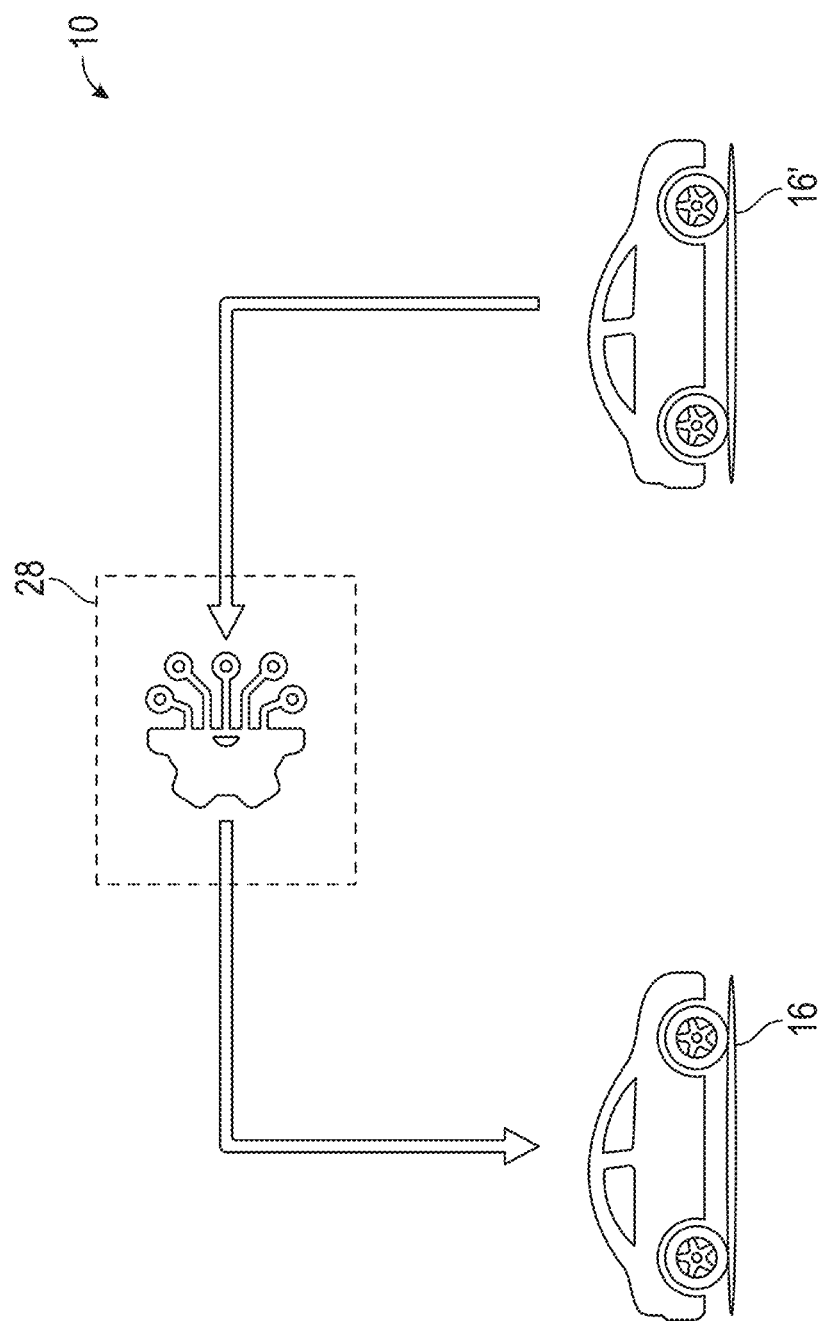
FIG. 8 is a schematic diagram depicting the deployment of predictions and cloud-based model training in a localized area in accordance with the system for predicting 5G user plane using control plane features and Granger causality for feature selection of FIG. 1 according to an aspect of the present disclosure.

Turning now to FIG. 8, and with continuing reference to FIGS. 1-7B, models generated by the PA 30 may be shared among a host vehicle 16 and additional vehicles 16' having similar characteristics. For example additional vehicles 16' traveling along the same or substantially similar paths at a particular physical location, and during the same time of day may have the same prediction model deployed to each of the similarly-situated additional vehicles 16' and vice versa. That is, one or more of a plurality of vehicles 16 may, through the PA 30, generate a user plane 12 and/or control plane 14 prediction which is then uploaded to the cloud computing server 28. The cloud computing server 28 then may deploy the user plane 12 and/or control plane 14 prediction to the additional vehicles 16' in the same vicinity. For each vehicle 16 that uploads data to the cloud computing server 28, additional data is used to further train the model in the cloud. That is, as each vehicle 16 reports to the cloud computing server 28, the upload data rate, GPS data, speed, and the like are uploaded and used as additional training information that may further refine and increase the accuracy of predictions generated by the PA 30.

A system and method for predicting a user plane 12 using control plane 14 features and granger causality for feature selection of the present disclosure offers several advantages. These include the ability to accurately capture complex causal relationships between control plane 14 information and user plane 12 metrics in a highly dynamic 5G environment in which changes in the control plane 14 can directly impact the user plane 12. Granger causality, offers a robust and justified means of selecting features for predictive models in a practical, reliable, and computationally low impact manner while optimizing performance, improving cellular communication reliability and user experience, functioning well in dynamic environments, and being easily adaptable to new and existing platforms without increasing system complexity.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for predicting a user plane using control plane features and Granger causality comprises:
   a host device having one or more sensors, the one or more sensors detecting telematics information, telecommunications information, host device telemetry information, and host device position information;
   one or more cloud computing servers;
   one or more controllers, each of the one or more controllers having a processor, a memory, and one or more input/output (I/O) ports, the I/O ports in communication with the one or more sensors and the one or more cloud computing servers; the memory storing programmatic control logic; the processor executing the programmatic control logic; the programmatic control logic including a prediction application (PA), the PA comprising:
      a first control logic for obtaining sensor data from the one or more sensors;
      a second control logic for sending control plane data and user plane data to infrastructure, and to the cloud computing servers via the I/O ports;
      a third control logic for accessing prior knowledge data stored within memory of the cloud computing servers;
      a fourth control logic for performing a Granger causality test on the user plane data and the control plane data;
      a fifth control logic for utilizing a prediction model to generate a prediction from fused user plane data and control plane data; and
      a sixth control logic for applying a prediction verifier to the prediction from the prediction model; and wherein the PA enables the host device to make reliable predictions that allow the host device to adapt to dynamic wireless communications network conditions even when a best possible model is not fully trained.

2. The system of claim 1 wherein the host device further comprises a vehicle communicating with the cloud computing servers via a wireless communications network; and wherein the first control logic further comprises:
obtaining telematics information, telecommunications information, vehicle telemetry information, and vehicle position information from the one or more sensors.

3. The system of claim 1 wherein the second control logic further comprises:
sending control plane data radio resource control (RRC) messages to infrastructure including one or more cellular towers and to one or more cloud computing servers;
receiving control plane data RRC messages from the one or more cellular towers and from the one or more cloud computing servers;
sending user plane data to the one or more cellular towers and to the one or more cloud computing servers; and
receiving user plane data from the one or more cellular towers and from the one or more cloud computing servers.

4. The system of claim 3 wherein the fourth control logic further comprises:
applying a Granger causality test to the control plane data RRC messages and to the user plane data, wherein the Granger causality test outputs a P-value that predicts when a change in control plane data RRC messages has caused a change in the user plane data; and
wherein the Granger causality test is applied via at least three distinct selections based on the P-value, including:
a threshold P-value selection, a fixed number P-value selection, and a conditional selection, wherein
in the threshold P-value selection, all control plane data RRC features having a P-value less than a predetermined threshold value are used;
in the fixed number P-value selection, control plane data RRC features are ranked from smallest to largest, and a predetermined quantity of features having smallest P-values are selected; and
in the conditional selection, control plane data RRC features from the threshold P-value selection and from the fixed number P-value selection are compared; and
when it is determined that the fixed number P-value selection has generated a P-value less than the P-value associated with the threshold P-value selection, the fixed number P-value selection indicates Granger causation between the control plane data RRC features and the user plane data;
when it is determined that the threshold P-value selection has generated a P-value less than the P-value associated with the fixed number P-value selection, the threshold P-value selection indicates Granger causation between the control plane data RRC features and the user plane data; and
when it is determined that the threshold P-value selection and the fixed number P-value selection values are equal to one another, then the threshold and fixed number P-value selections are equally indicative of Granger causation between the control plane data RRC features and the user plane data.

5. The system of claim 4 wherein the fifth control logic further comprises:
utilizing output of the Granger causality test to reduce a quantity of data fed into the prediction model from a first quantity of data to a second quantity of data smaller than the first and preventing overfeeding of the prediction model;
utilizing one or more of a long short-term memory (LSTM) model, a recurrent neural network (RNN), or an autoregressive integrated moving average model (ARIMA) to generate a multivariant prediction from user plane data and control plane data output from the Granger causality test.

6. The system of claim 5 further comprising:
control logic for online training the PA by:
initializing the PA as a zero feature model as a baseline;
sending control plane messages with Granger causality test result information and a prediction root-mean-square error (RMSE) of current on-board zero-feature model to the cloud computing server;
evaluating on-board zero-feature model prediction RMSE training speed and predictions; and
selectively deploying a new model to the host device.

7. The system of claim 5 wherein the sixth control logic further comprises:
receiving data indicating a trigger event has occurred;
initializing the prediction verifier with prior knowledge and with a user plane time series u(n) and a control plane time series C(n) as inputs; and
generating a weighted fused statistical prediction according to: $p_f = w1 \cdot p_s + w2 \cdot p_l$, where w1 is a first weight applied to a statistical prediction $p_s$ generated by a statistical prediction model as applied to the prior knowledge and user plane time series, w2 is a second weight, different from the first weight, applied to an LSTM prediction $p_l$, and is a fused prediction applied to the fused user plane and control plane data.

8. The system of claim 1 wherein the third control logic further comprises:
accessing prior knowledge data including: data obtained from sensors of the host device and from additional devices, data obtained from global positioning system (GPS) satellites, data obtained from infrastructure including one or more cellular towers; and
comparing data control plane data RRC messages from the host device to the prior knowledge data to generate a partial input to the prediction verifier.

9. The system of claim 1 wherein the control logic of the PA further includes:
control logic that applies non-uniform upsampling in data collection and time series formulation for both user plane and control plane data.

10. The system of claim 9, wherein the non-uniform upsampling further comprises:
control logic that reduces bandwidth consumption and processing complexity from a first level to a second level lower than the first level by obtaining user plane and control plane data only upon the occurrence of a trigger event and at one or more additional points in time after a predefined time δt after the trigger event; and
when a value of the control plane time series at time δt after the trigger event is greater than or equal to a value of the control plane time series at a subsequent trigger event, causing the PA to increment the control plane time series to collect data upon the occurrence of a subsequent trigger event, and when a value of the control plane time series at time δt after the trigger event is less than the value of the control plane time series at the subsequent trigger event, causing the PA to upsample the control plane time series.

11. A method for predicting a user plane using control plane features and Granger causality comprises:
detecting telematics information, telecommunications information, host device telemetry information, and host device position information with one or more sensors mounted to a host device;
utilizing one or more cloud computing servers;
utilizing one or more controllers, each of the one or more controllers having a processor, a memory, and one or more input/output (I/O) ports, the I/O ports in communication with the one or more sensors and the one or more cloud computing servers;
the memory storing programmatic control logic; the processor executing the programmatic control logic; the programmatic control logic including a prediction application (PA), the PA comprising:
obtaining sensor data from the one or more sensors;
sending control plane data and user plane data to infrastructure, and to the cloud computing servers via the I/O ports;
accessing prior knowledge data stored within memory of the cloud computing servers;
performing a Granger causality test on the user plane data and the control plane data;
utilizing a prediction model to generate a prediction from fused user plane data and control plane data; and
applying a prediction verifier to the prediction from the prediction model; and
enabling, via the PA, the host device to make reliable predictions that allow the host device to adapt to dynamic wireless communications network conditions even when a best possible model is not fully trained.

12. The method of claim 11 wherein the host device further comprises a vehicle communicating with the cloud computing servers via a wireless communications network; and wherein the control logic of the PA further comprises:
obtaining telematics information, telecommunications information, vehicle telemetry information, and vehicle position information from the one or more sensors.

13. The method of claim 11 further comprising:
sending control plane data radio resource control (RRC) messages to infrastructure including one or more cellular towers and to one or more cloud computing servers;
receiving control plane data RRC messages from the one or more cellular towers and from the one or more cloud computing servers;
sending user plane data to the one or more cellular towers and to the one or more cloud computing servers; and
receiving user plane data from the one or more cellular towers and from the one or more cloud computing servers.

14. The method of claim 13 further comprising:
applying a Granger causality test to the control plane data RRC messages and to the user plane data, wherein the Granger causality test outputs a P-value that predicts when a change in control plane data RRC messages has caused a change in the user plane data; and wherein the Granger causality test is applied via at least three distinct selections based on the P-value, including:
a threshold P-value selection, a fixed number P-value selection, and a conditional selection, wherein
in the threshold P-value selection, all control plane data RRC features having a P-value less than a predetermined threshold value are used;
in the fixed number P-value selection, control plane data RRC features are ranked from smallest to largest, and a predetermined quantity of features having smallest P-values are selected; and
in the conditional selection, control plane data RRC features from the threshold P-value selection and from the fixed number P-value selection are compared; and
when it is determined that the fixed number P-value selection has generated a P-value less than the P-value associated with the threshold P-value selection, the fixed number P-value selection indicates Granger causation between the control plane data RRC features and the user plane data;
when it is determined that the threshold P-value selection has generated a P-value less than the P-value associated with the fixed number P-value selection, the threshold P-value selection indicates Granger causation between the control plane data RRC features and the user plane data; and
when it is determined that the threshold P-value selection and the fixed number P-value selection values are equal to one another, then the threshold and fixed number P-value selections are equally indicative of Granger causation between the control plane data RRC features and the user plane data.

15. The method of claim 14 further comprising:
utilizing output of the Granger causality test to reduce a quantity of data fed into the prediction model from a first quantity of data to a second quantity of data smaller than the first and preventing overfeeding of the prediction model;
utilizing one or more of a long short-term memory (LSTM) model, a recurrent neural network (RNN), or an autoregressive integrated moving average model (ARIMA) to generate a multivariant prediction from user plane data and control plane data output from the Granger causality test.

16. The method of claim 15 further comprising:
online training the PA by:
initializing the PA as a zero feature model as a baseline;
sending control plane messages with Granger causality test result information and a prediction root-mean-square error (RMSE) of current on-board zero-feature model to the cloud computing server;
evaluating on-board zero-feature model prediction RMSE training speed and predictions; and
selectively deploying a new model to the host device.

17. The method of claim 15 further comprising:
receiving data indicating a trigger event has occurred;
initializing the prediction verifier with prior knowledge and with a user plane time series u(n) and a control plane time series C(n) as inputs; and
generating a weighted fused statistical prediction according to: $p_f = w1 \cdot p_s + w2 \cdot p_l$, where w1 is a first weight applied to a statistical prediction $p_s$ generated by a statistical prediction model as applied to the prior knowledge and user plane time series, w2 is a second weight, different from the first weight, applied to an LSTM prediction $p_l$, and is a fused prediction applied to the fused user plane and control plane data.

18. The method of claim 11 further comprising:
accessing prior knowledge data including: data obtained from sensors of the host device and from additional devices, data obtained from global positioning system (GPS) satellites, data obtained from infrastructure including one or more cellular towers; and
comparing data control plane data RRC messages from the host device to the prior knowledge data to generate a partial input to the prediction verifier.

19. The method of claim 11 further comprising:
applying non-uniform upsampling in data collection and time series formulation for both user plane and control plane data; and
reducing bandwidth consumption and processing complexity from a first level to a second level lower than the first level by obtaining user plane and control plane data only upon the occurrence of a trigger event and at one or more additional points in time after a predefined time δt after the trigger event; and
when a value of the control plane time series at time δt after the trigger event is greater than or equal to a value of the control plane time series at a subsequent trigger event, causing the PA to increment the control plane time series to collect data upon the occurrence of a subsequent trigger event, and when a value of the control plane time series at time δt after the trigger event is less than the value of the control plane time series at the subsequent trigger event, causing the PA to upsample the control plane time series.

20. A method for predicting a user plane using control plane features and Granger causality comprises:
detecting telematics information, telecommunications information, host device telemetry information, and host device position information with one or more sensors mounted to a host vehicle communicating with one or more cloud computing servers via a wireless communications network;
utilizing one or more controllers, each of the one or more controllers having a processor, a memory, and one or more input/output (I/O) ports, the I/O ports in communication with the one or more sensors and the one or more cloud computing servers;
the memory storing programmatic control logic; the processor executing the programmatic control logic; the programmatic control logic including a prediction application (PA), the PA comprising:
obtaining telematics information, telecommunications information, vehicle telemetry information, and vehicle position information from the one or more sensors;
sending, via the I/O ports, control plane data radio resource control (RRC) messages to infrastructure including one or more cellular towers and to one or more cloud computing servers;
receiving control plane data RRC messages from the one or more cellular towers and from the one or more cloud computing servers;
sending user plane data to the one or more cellular towers and to the one or more cloud computing servers; and
receiving user plane data from the one or more cellular towers and from the one or more cloud computing servers;
accessing prior knowledge data stored within memory of the cloud computing servers, the prior knowledge data including: data obtained from sensors of the host device and from additional devices, data obtained from global positioning system (GPS) satellites, data obtained from infrastructure including one or more cellular towers; and
comparing data control plane data RRC messages from the host device to the prior knowledge data to generate a partial input to the prediction verifier;
applying a Granger causality test to the control plane data RRC messages and to the user plane data, wherein the Granger causality test outputs a P-value that predicts when a change in control plane data RRC messages has caused a change in the user plane data; and
wherein the Granger causality test is applied via at least three distinct selections based on the P-value, including:
a threshold P-value selection, a fixed number P-value selection, and a conditional selection, wherein
in the threshold P-value selection, all control plane data RRC features having a P-value less than a predetermined threshold value are used;
in the fixed number P-value selection, control plane data RRC features are ranked from smallest to largest, and a predetermined quantity of features having smallest P-values are selected; and
in the conditional selection, control plane data RRC features from the threshold P-value selection and from the fixed number P-value selection are compared; and
when it is determined that the fixed number P-value selection has generated a P-value less than the P-value associated with the threshold P-value selection, the fixed number P-value selection indicates Granger causation between the control plane data RRC features and the user plane data;
when it is determined that the threshold P-value selection has generated a P-value less than the P-value associated with the fixed number P-value selection, the threshold P-value selection indicates Granger causation between the control plane data RRC features and the user plane data; and
when it is determined that the threshold P-value selection and the fixed number P-value selection values are equal to one another, then the threshold and fixed number P-value selections are equally indicative of Granger causation between the control plane data RRC features and the user plane data;
utilizing output of the Granger causality test to reduce a quantity of data fed into the prediction model from a first quantity of data to a second quantity of data smaller than the first and preventing overfeeding of the prediction model;
utilizing one or more of a long short-term memory (LSTM) model, a recurrent neural network (RNN), or an autoregressive integrated moving average model (ARIMA) to generate a multivariant prediction from user plane data and control plane data output from the Granger causality test;

utilizing a prediction model to generate a prediction from fused user plane data and control plane data, including:
  online training the PA by:
    initializing the PA as a zero feature model as a baseline;
    sending control plane messages with Granger causality test result information and a prediction root-mean-square error (RMSE) of current on-board zero-feature model to the cloud computing server;
    evaluating on-board zero-feature model prediction RMSE training speed and predictions; and
    selectively deploying a new model to the host device;
  applying a prediction verifier to the prediction from the prediction model, including:
    receiving data indicating a trigger event has occurred;
    initializing the prediction verifier with prior knowledge and with a user plane time series $u(n)$ and a control plane time series $C(n)$ as inputs; and
    generating a weighted fused statistical prediction according to: $p_f = w1 \cdot p_s + w2 \cdot p_l$, where w1 is a first weight applied to a statistical prediction $p_s$ generated by a statistical prediction model as applied to the prior knowledge and user plane time series, w2 is a second weight, different from the first weight, applied to an LSTM prediction $p_l$, and is a fused prediction applied to the fused user plane and control plane data;
applying non-uniform upsampling in data collection and time series formulation for both user plane and control plane data; and
reducing bandwidth consumption and processing complexity from a first level to a second level lower than the first level by obtaining user plane and control plane data only upon the occurrence of a trigger event and at one or more additional points in time after a predefined time δt after the trigger event; and
  when a value of the control plane time series at time δt after the trigger event is greater than or equal to a value of the control plane time series at a subsequent trigger event, causing the PA to increment the control plane time series to collect data upon the occurrence of a subsequent trigger event, and when a value of the control plane time series at time δt after the trigger event is less than the value of the control plane time series at the subsequent trigger event, causing the PA to upsample the control plane time series; and
enabling, via the PA, the host device to make reliable predictions that allow the host device to adapt to dynamic wireless communications network conditions even when a best possible model is not fully trained.

* * * * *